(12) United States Patent
Kasat et al.

(10) Patent No.: US 9,131,014 B2
(45) Date of Patent: *Sep. 8, 2015

(54) HITLESS PRUNING PROTOCOL UPGRADE ON SINGLE SUPERVISOR NETWORK DEVICES

(75) Inventors: Siddharth Kasat, San Jose, CA (US); Christian Sasso, Milpitas, CA (US); Ankur Goyal, Sunnyvale, CA (US); Shivaranjani Sankara Krishnan, Sunnyvale, CA (US); Yibin Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/589,333

(22) Filed: Aug. 20, 2012

(65) Prior Publication Data

US 2014/0050077 A1 Feb. 20, 2014

(51) Int. Cl.
*G01R 31/08* (2006.01)
*H04L 12/28* (2006.01)
(Continued)

(52) U.S. Cl.
CPC ............ *H04L 69/40* (2013.01); *H04L 12/4641* (2013.01)

(58) Field of Classification Search
CPC ... H04L 49/201; H04L 49/354; H04L 49/256; H04L 12/4695; H04L 12/4687; H04L 12/4641; H04L 12/185; H04L 12/462; H04L 47/34; H04L 37/32; H04L 45/563; H04L 12/467; H04L 41/06; H04L 41/0631; H04L 41/0654; H04L 41/0681; H04L 69/40; H04L 69/28

USPC ................ 370/351, 390, 389, 392, 384, 385, 370/396–399, 395.21, 410, 428, 429, 426, 370/432, 216, 225, 218, 241, 256, 230, 370/235; 709/220, 221, 222, 223, 224, 225, 709/226, 229, 230, 231, 232; 717/168, 171, 717/176, 172, 100, 124, 177
See application file for complete search history.

(56) References Cited

U.S. PATENT DOCUMENTS 6,473,403 B1  10/2002  Bare
6,526,054 B1   2/2003  Li et al.
(Continued)

OTHER PUBLICATIONS

Understanding Vlan Trunk Protocol (VTP), Cisco Design TechNotes, Jul. 30, 2007, Document ID 10558, Online publication.
(Continued)

*Primary Examiner* — Hanh N Nguyen
(74) *Attorney, Agent, or Firm* — Patterson + Sheridan, LLP (57) ABSTRACT

In Service Software Upgrade (ISSU) permits administrators to upgrade the control plane software of a network device without any disruption to the traffic passing through the data plane of the network device. However, because the control plane is unavailable, the network device is unable to transmit periodic messages to re-subscribe to specific VLANs. This may result in a service outage in end devices that rely on the network device to receive data assigned to those VLANs. To prevent the network device from being unsubscribed from the VLANs while the control plane is unavailable, the network device may transmit a control plane message before starting ISSU. Once a neighboring network device receives the message, the neighboring device delays unsubscribing the network device until the control plane is again available. Thus, the network device may perform ISSU without the possibility of data traffic not reaching end devices.

16 Claims, 7 Drawing Sheets

(51) Int. Cl.
*H04J 3/16* (2006.01)
*H04L 29/14* (2006.01)
*H04L 12/46* (2006.01)

(56) References Cited

U.S. PATENT DOCUMENTS

| | | | |
|---|---|---|---|
| 6,728,777 | B1 | 4/2004 | Lee et al. |
| 6,937,576 | B1 | 8/2005 | Di Benedetto et al. |
| 7,286,491 | B1 | 10/2007 | Smith |
| 7,392,520 | B2* | 6/2008 | de Heer et al. ............... 717/171 |
| 7,525,974 | B2 | 4/2009 | Mancour |
| 7,551,571 | B2* | 6/2009 | Goldberg et al. ............ 370/256 |
| 7,724,745 | B1* | 5/2010 | Elangovan et al. ........... 370/392 |
| 7,957,330 | B1* | 6/2011 | Bahadur et al. ............... 370/282 |
| 8,542,681 | B2* | 9/2013 | Andrews et al. .............. 370/390 |
| 8,570,877 | B1* | 10/2013 | Bayar et al. ................. 370/241.1 |
| 8,812,708 | B2* | 8/2014 | Tsai et al. ..................... 709/230 |
| 2002/0101875 | A1 | 8/2002 | Lui et al. |
| 2013/0024580 | A1* | 1/2013 | Tsai et al. ..................... 709/230 |
| 2014/0344426 | A1 | 11/2014 | Tsai et al. |

OTHER PUBLICATIONS

Virtual Bridged Local Area Networks—Amendment 7: Multiple Registration Protocol, IEEE Standard for Local and metropolitan area networks, Jun. 22, 2007, IEEE Computer Society, New York, NY.

* cited by examiner

HITLESS PRUNING PROTOCOL UPGRADE ON SINGLE SUPERVISOR NETWORK DEVICES

TECHNICAL FIELD

Embodiments presented in this disclosure generally relate to maintaining data traffic flow in a network device during a control plane outage, and more specifically, to ensuring the network device remains subscribed to the appropriate VLANs during the control plane outage.

BACKGROUND

The traffic flowing into a network device—e.g., a router, switch, bridge, server, and the like—can be logically divided into at least three separate planes: the management plane, control plane, and data plane. In this disclosure, only the control plane and data plane will be discussed. In general, the control plane processes any received or generated data (i.e., control plane data) needed to establish, maintain, or configure the forwarding logic in a network device. Thus, the ultimate destination of control plane data is a network device—either the network device that generated the data or a network device communicatively coupled to the originating network device. In contrast, data plane packets flow through a network device and are forwarded using the forwarding logic established by the control plane. Based on the forwarding logic, the network device forwards the data plane packets to other network devices until the packets reach their ultimate destination, e.g., a user computing device. Accordingly, the data plane is also referred to as the forwarding plane since the destinations of data plane packets are not a network devices.

The manner in which a network device processes a received packet determines whether the packet is data plane traffic or control plane traffic. For example, if a first network device transmits a packet that reconfigures the forwarding logic in a second network device, the packet is considered as part of the control plane in both network devices. However, if that same packet traversed a third network device in order to reach the second network device, because the third network device merely forwarded the packet without processing it further, the packet is part of the data plane of the third network device.

Moreover, traffic flowing in the data and control planes may be divided into a plurality of virtual local access networks (VLANs). A VLAN has the same attributes as a physical local area network (LAN), but allows for end devices to be grouped together even if they are not connected to the same network switch. VLANs are created to provide the segmentation services traditionally provided by routers in LAN configurations. VLANs address issues such as scalability, security, and network management. By using VLANs, a network administrator can control traffic patterns and react quickly to relocations of network devices. VLANs provide the flexibility to adapt to changes in network requirements and allow for simplified administration.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

One embodiment of the present disclosure includes a method of managing a control plane outage in a first network device coupled to a second network device. In response to detecting an upcoming control plane outage at the first network device, the method transmits a first message to the second network device where, upon receiving the first message, the second network device is configured in a manner to prevent the second network device from unsubscribing the first network device from one or more VLANs for at least some period of time. While the control plane of the first network device is unavailable, the method receives data assigned to the one or more VLANs from the second network device and, after determining that the control plane is available, the method periodically transmitting update messages to the second network device identifying one or more VLANs to which the first network device wants to subscribe.

Another embodiment of the present disclosure includes a network device that includes logic configured to detect an upcoming control plane outage in the network device and, in response to detecting the upcoming control plane outage at the network device, transmit a first message to a neighboring network device where, upon receiving the first message, the neighboring network device is configured in a manner to prevent the neighboring network device from unsubscribing the network device from one or more VLANs for at least some period of time. The network device including a data port configured to, while the control plane of the network device is unavailable, receive data assigned to the one or more VLANs from the neighboring network device. Moreover, upon the determining that the control plane is available, the logic is configured to transmit periodic update messages to the neighboring network device identifying one or more VLANs to which the network device wants to subscribe.

Another embodiment of the present disclosure includes a computer program product that includes computer code that detects an upcoming control plane outage in a first network device coupled to a second network device and, in response to detecting the upcoming control plane outage at the first network device, transmits a first message to the second network device where, upon receiving the first message preventing, the second network device is configured in a manner to prevent the second network device from unsubscribing the first network device from one or more VLANs for at least some period of time. The product also includes computer code that, while the control plane of the first network device is unavailable, receives data assigned to the one or more VLANs from the second network device and, upon the determining that the control plane is available, transmits periodic update messages to the second network device identifying one or more VLANs to which the first network device wants to subscribe. The program product further includes a computer readable storage medium that stores the computer codes.

DESCRIPTION OF EXAMPLE EMBODIMENTS

Network devices have a limited amount of processing resources for processing and forwarding incoming traffic. As such, the network devices may want to limit types of traffic they receive. One example of traffic that a network device may want to limit is flood traffic. Generally, flood traffic is network data traffic that does not specify a particular destination end point—e.g., flood traffic packets may lack a destination MAC address in the frame. Broadcast traffic or unknown unicast traffic are examples of flood traffic. Because flood traffic lacks a specific destination, a network device may forward flood traffic to every network device connected to its ports. However, forwarding flood traffic to every connected network device may generate unnecessary network traffic since many of the network devices may not need to forward the flood traffic for it to reach a destination end device. For example, if the network device receiving the flood traffic is not part of a trunk link that couples two end devices in the same VLAN, the network device does not need to forward the flood traffic in order for the traffic to reach the end devices.

To improve efficiency, many network protocols (e.g., Virtual Trunking Protocol (VTP) and Multiple VLAN Registration Protocol (MVRP)) establish pruning techniques that enable network devices to select which VLANs the network devices wish to receive flood traffic for. Stated differently, a network device may subscribe to select VLANs for receiving flood traffic, and could then receive flood traffic related only to these selected VLANs. Thus, before a network device forwards flood traffic to a connected network device, the network device checks to ensure the connected network device is subscribed to the VLAN associated with the flood traffic. If not, the receiving network device does not forward the flood traffic.

To subscribe to one or more VLANs, a network device sends control plane messages that identify the VLANs of interest. For example, the network device may subscribe only to the VLANs associated with end devices (e.g., user computers, servers, etc.) that rely on the network device to receive data across the network. That is, the network device is part of a trunk link connecting the end devices. Once the relevant VLANs are identified, the network device transmits the control plane message to neighboring (or peer) network devices which update their forwarding logic to ensure the flood traffic associated with only the identified VLANs is forwarded. Because network topology and the VLAN subscriptions may change, the network protocols may require the network devices to periodically re-subscribe to the VLANs by sending additional control plane messages to the neighboring network devices. If the neighboring network devices do not receive the new control plane packets in a timely manner, the neighboring device may unsubscribe the network device from the indentified VLANs. Allowing the subscription to timeout may avoid forwarding unnecessary traffic to the network device from the neighboring device if the network device goes down or is otherwise unavailable.

In Service Software Upgrade (ISSU) is a feature which permits administrators to upgrade the control plane software or firmware of a network device without any disruption to the traffic passing through the data plane of the network device. However, because the control plane is unavailable, the network device is unable to transmit periodic control plane messages to re-subscribe to VLANs of interest. This problem is especially relevant in single supervisor network devices— i.e., network devices without redundant supervisors that allow at least some portion of the control plane to function during ISSU. Accordingly, before ISSU is finished and the control plane comes back online, a single supervisor network device may have been unsubscribed from VLANs, and thus, not received flood traffic associated with those VLANs. This may result in the end devices not receiving flood traffic intended for them.

As such, embodiments generally provide techniques for preventing a single supervisor network device from being unsubscribed from the VLANs while the control plane is unavailable. The network device may transmit a control plane message before starting ISSU. That is, once the network device receives an instruction to perform a software upgrade that renders the control plane unavailable, before performing the upgrade, the network device transmits a first control plane message to each of the neighboring network devices that prevents these devices from unsubscribing the network device before the device can send a second control plane message after the control plane becomes available. For example, the first message may increase the value of a timer that governs when the connected network device un-subscribes the network device from the VLANs. Alternatively, the first message may instruct the neighboring network device to change its state such that the connected network device will not prune the identified VLANs until the second message is received. In this manner, the single supervisor network device may perform ISSU without the potential of flood traffic not reaching any end devices coupled directly or indirectly to the network device.

A Network Implementing VLANs

Figure 1:
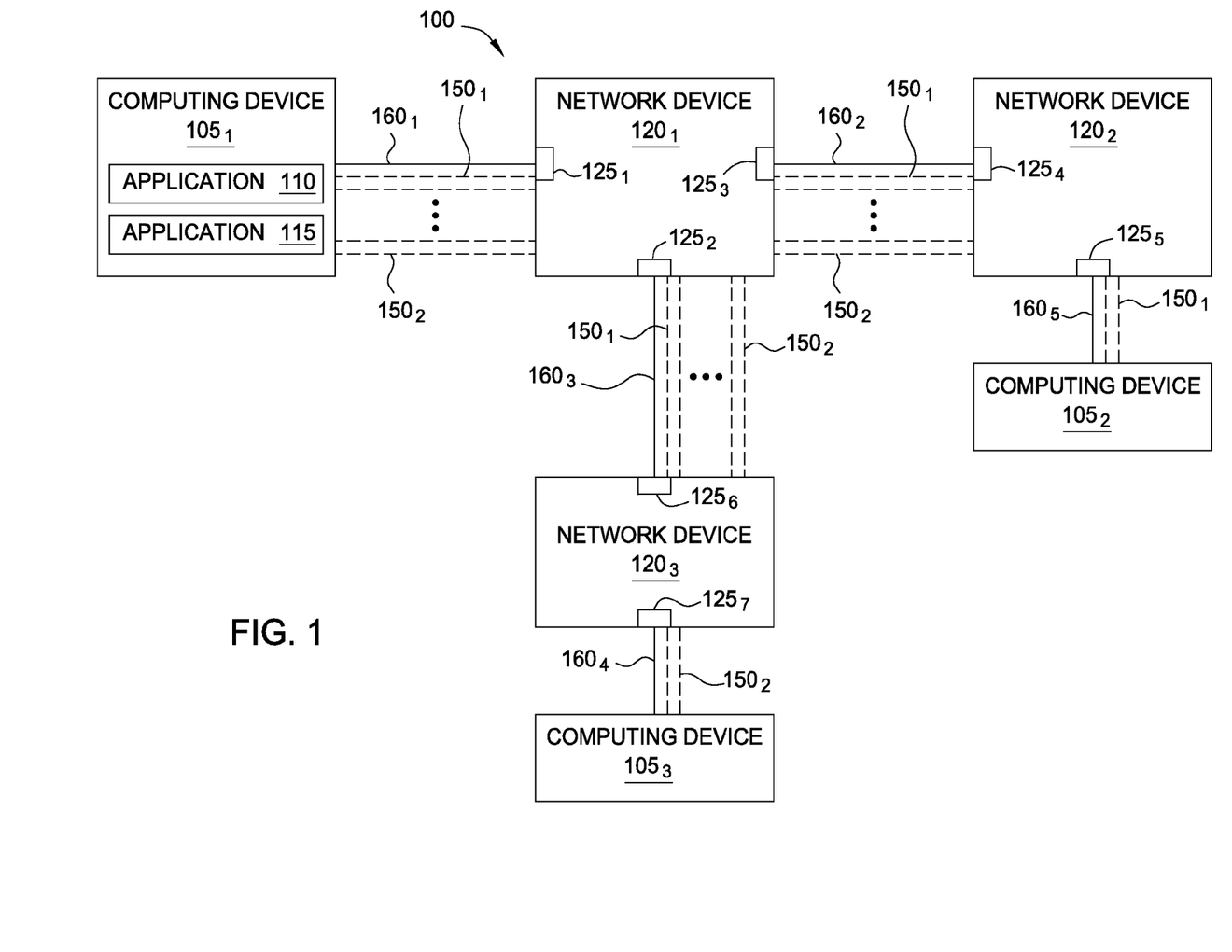
FIG. 1 illustrates a network implementing a plurality of VLANs, according to one embodiment described herein.

FIG. 1 illustrates a network implementing a plurality of VLANs, according to one embodiment described herein. The network 100 includes a plurality of computing devices 105 (e.g., network end devices) and network devices 120 (e.g., routers, switches, bridges, servers, and the like). Each communication link 160 communicatively couples a computing device 105 to a network device 120 or couples two network devices 120. The communication links 160 may support wired communication (e.g., an Ethernet cable) or wireless communication. As shown, the communication links 160 transmit data assigned to one or more different VLANs 150 using the ports 125. For example, link $160_1$ transmits data packets transmitted between computing device $105_1$ and network device $120_1$ via two VLANs—VLAN $150_1$ and $150_2$— although more than two VLANs may be used. In this manner, the data traversing a single one of the links 160 may be logically divided into a plurality of VLANs 150.

Generally, VLANs include features that enable a network administrator to manage the data traffic in each VLAN separately by changing the VLAN's scalability, security, or management settings. For example, application 110 executing on computing device $105_1$ may transfer data on the network 100 exclusively using VLAN $150_1$ while application 115 transfers data using VLAN $150_2$. The VLANs $150_{1,2}$ may use the same communication links 160 to transfer data between the computing devices 105, but an administrator may manage the VLANs 150 as two separate data flows. For example, the bandwidth of communication link $160_1$ may be divided such that a minimum of 40% of the bandwidth is assigned to VLAN $150_1$ and a minimum of 60% is assigned to VLAN $150_2$. Nonetheless, the bandwidth of the other communication links may be divided in a different manner. For example, because application 110 may never send data to computing device $105_3$ since they belong to different VLANs 150, communication link $160_3$ may guarantee a much higher bandwidth to VLAN $150_2$ than VLAN $150_1$. Nonetheless, the network 100 may change such that computer devices $105_2$ and $105_3$ are included within both VLANs $150_1$ and $150_2$ or even VLANs not shown in FIG. 1. However, in one embodiment, the network devices 120 may not be routers but only switches, bridges, or some combination of both.

VLAN Pruning

Figure 2A:
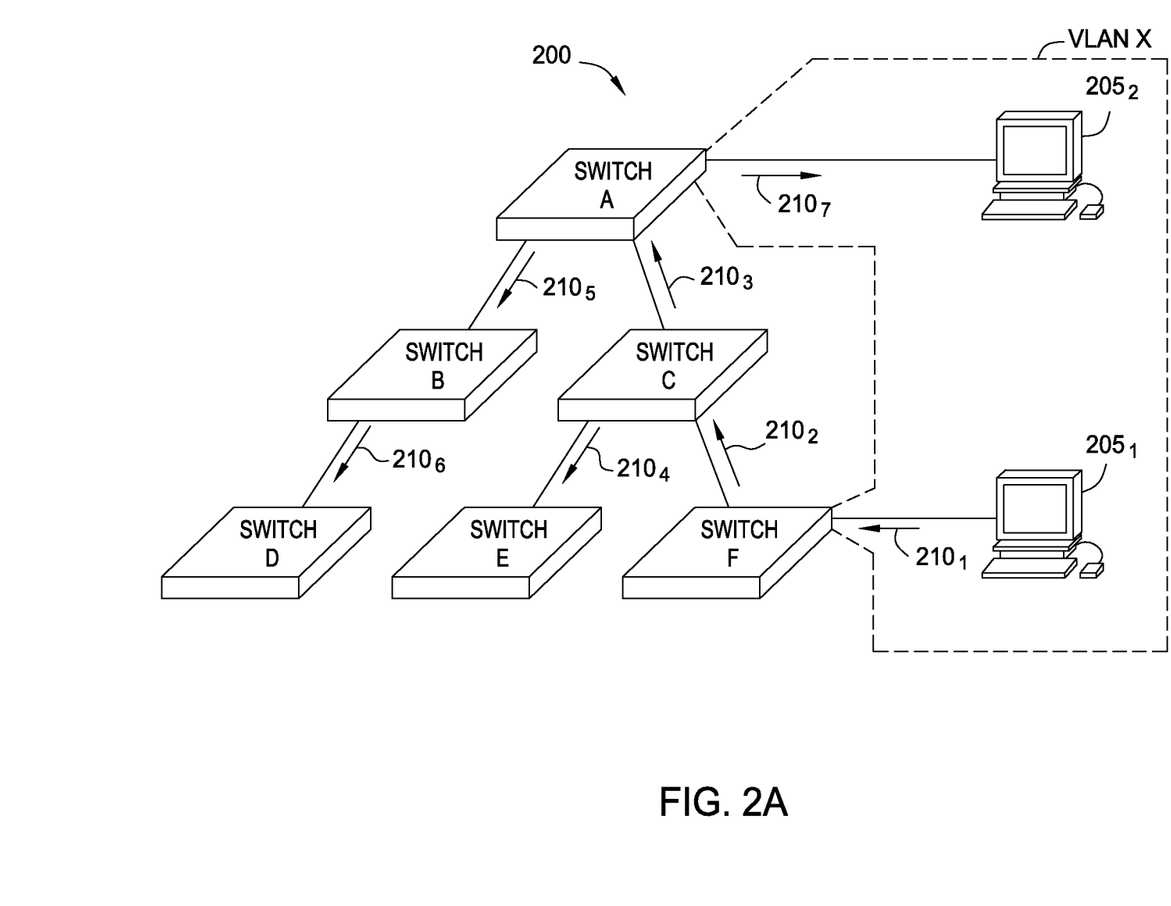
FIGS. 2A-2B illustrate a network that forwards flood traffic between network devices, according to embodiments described herein.

FIGS. 2A-2B illustrate a network that forwards flood traffic between network devices, according to embodiments described herein. FIG. 2A illustrates a network 200 that transmits flood traffic between two computing devices 205 in VLAN X. Each arrow 210 represents the flood traffic traversing a communication link between either two switches or a switch and a computing device 205. As mentioned previously, flood traffic is one or more data packets that do not designate a particular destination address (e.g., unknown unicast traffic) or designate that all computing devices connected to the VLAN as recipients (e.g., broadcast traffic). Because each of the switches is part of VLAN X, the flood traffic is transmitted to each of the switches. As shown by arrow $210_1$, computing device $205_1$ transmits flood traffic to Switch F which forwards the traffic to connected network devices, in this case, Switch C. Because Switch C is coupled to both Switch A and Switch E, Switch C transmits copies of the flood traffic to both network devices. This process continues until each switch in network 200 receives a copy of the flood traffic. However, because VLAN X includes only two end devices—compute elements $205_1$ and $205_2$—only Switches A, C, and F need to receive and forward the flood traffic. Thus, Switches A, C, and F form a trunk link connect the end devices. The flood traffic received at Switch D and E is simply ignored or dropped.

Figure 2B:
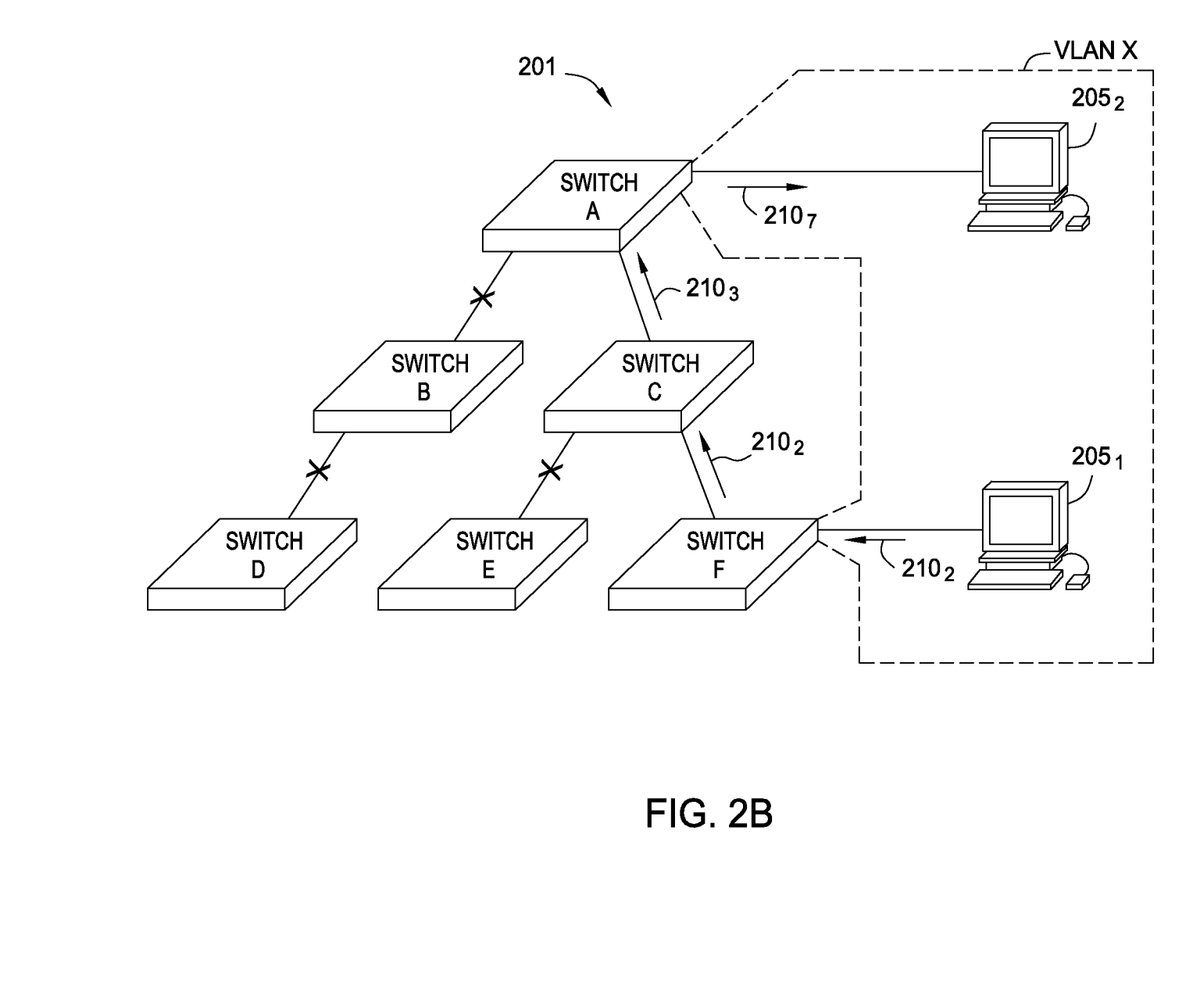

FIG. 2B illustrates pruning in order to avoid unnecessary traffic. In network 201, the switches are configured to avoid sending the flood traffic to switches that are not needed when transmitting data to a computing device 205 in the VLAN. Specifically, the Switches A-F swap control plane messages amongst each other that identify relevant VLANs. As used herein, an identified VLAN is a VLAN that a network devices subscribes to in order to receive flood traffic from a neighboring network device. As shown, Switch C has sent a control plane message to Switch F that instructs Switch F to forward all flood traffic assigned to VLAN X to Switch C. However, Switch E has transmitted a control plane message to Switch C that instructs Switch C to not forward any flood traffic assigned to VLAN X to Switch E. The control message logically disconnects Switch C at least partially from Switch E (as represented by the "X") since Switch E no longer receives flood traffic assigned to VLAN X via Switch C. In contrast, Switch A sends a control plane message to Switch C instructing Switch C to forward all flood traffic associated with VLAN X. Stated simply, any switch that is not part of a trunk link delivering flood traffic to a computing device in the VLAN may send a control message instructing neighboring switches to not forward flood traffic.

According to one embodiment, when receiving flood traffic, a switch evaluates the forwarding logic associated with each of its ports or connections. For example, after receiving flood traffic from Switch F, Switch C determines which connected switch has subscribed to VLAN X. In this case, Switch A has subscribed but Switch E has not. Accordingly, Switch C forwards a copy of the flood traffic to Switch A but does not forward a copy to Switch E.

In one embodiment, Switch D may also send a control plane message to Switch B unsubscribing Switch D from receiving flood traffic of VLAN X. Moreover, the switches may periodically re-transmit the VLAN subscription messages to neighboring switches—i.e., the network devices to which the switch is directly connected—to reflect any changes in network topology. For example, an end device configured to transmit data using VLAN X may be coupled to Switch B. Accordingly, Switch B may change its subscription to include VLAN X thereby ensuring all flood traffic associated with VLAN X reaches the newly connected end device. However, Switch D and Switch E may remain unsubscribed to VLAN X since these switches are not used to provide the flood traffic to any computing devices associated with VLAN X. For example, even if a new end device was connected to Switch D but is not included within VLAN X, Switch D may remain unsubscribed to VLAN X.

VLAN Pruning Using VTP

Figure 3:
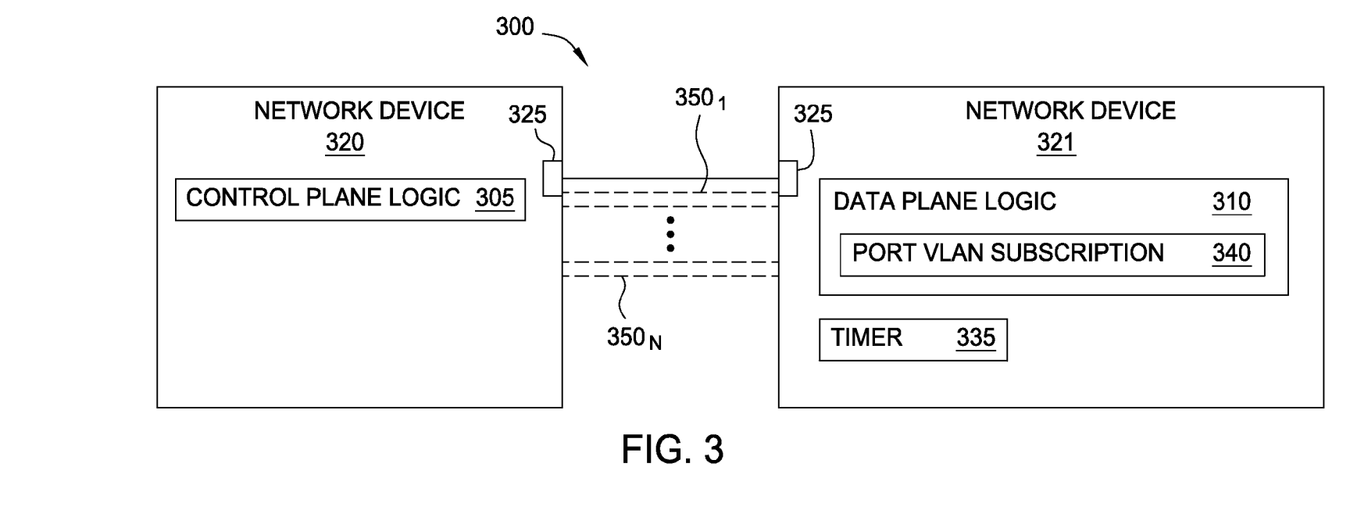
FIG. 3 illustrates a network that permits data plane traffic associated with multiple VLANs to flow during a control plane outage, according to one embodiment described herein.

FIG. 3 illustrates a network that permits data plane traffic associated with multiple VLANs to flow during a control plane outage, according to one embodiment described herein. In one embodiment, the network 300 may use VTP to manage and configure the VLANs 350. Specifically, the network 300 may use the VTP extension for Optimized Flooding (VTP Pruning) to optimize the usage of network bandwidth by restricting flood traffic to only appropriate trunk links necessary for the flood traffic to reach appropriate end devices. Referring to FIG. 2B, the trunk link is defined by Switch A, C, and F which link together the end devices $205_1$ and $205_2$. Thus, VTP is used to remove (or prune) any unnecessary branches from this trunk link—i.e., Switches B, D, and E.

As shown, network 300 includes two network devices 320, 321 where the communication link between the devices 320, 321 may be divided into one or more VLANs 350. As used herein, network device 321 is described as the forwarding network device while network device 320 is described as the receiving network device. That is, the network device 321 receives flood traffic and determines whether that data should be forwarded to the network device 320. Network device 320 includes control plane logic 305 which may be firmware, software, hardware, or some combination thereof. In general, the control plane logic 305 transmits and receives control plane messages transmitted in the network 300. Moreover, the control plane logic 305 may be tasked with managing the VLANs 350 as defined by VTP. Although not shown, network device 321 also includes control plane logic that may perform a similar function.

Network device 321 includes data plane logic 310 which may be firmware, software, hardware, or some combination thereof. Data plane logic 310 may further include forwarding logic that defines how received data plane packets are forwarded. For example, the forwarding logic may include an associative memory element (e.g., a content addressable memory) for identifying the destination of received data packets. The data plane logic 310 also includes a port VLAN subscription 340 that identifies the VLANs 350 to which a device connected to a specific port is subscribed. For example, the subscription 340 may indicate that network device 320 is subscribed to VLANS $350_1$, $350_3$, and $350_4$ but not to VLAN $350_2$. Based on this record, the network device 321 forwards only the flood traffic listed in the port VLAN subscription 340 on to the associated port 325. Thus, the port VLAN subscription 340 may be considered as part of the forwarding logic of the data control plane that enables the network device 321 to properly forward received flood traffic. As such, the network device 321 may include an individual port VLAN subscription 340 for each port 325 in the network device 321. Although not shown, the network device 320 may also include data plane logic for forwarding data received from network device 321 to other connected network devices or end devices.

The network device 321 includes a timer 335 used to ensure that a current VLAN subscription is still valid. VTP defines that once a connected network device has subscribed to a particular VLAN, if a new VTP pruning message is not received in 19 second, the subscription expires—e.g., the network device 321 will no longer forward flood traffic to device 320. The network device 321 resets the timer 335 to a value of 19 seconds each time a new VTP pruning message is received from network device 320. Moreover, the network device 321 may update the port VLAN subscription 340 based on the new VTP pruning message.

Figure 4:
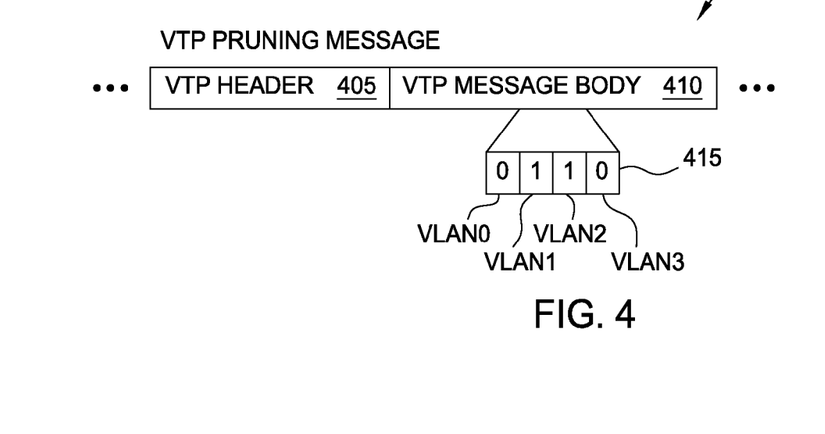
FIG. 4 illustrates a portion of a data packet that includes a VTP pruning message, according to one embodiment described herein.

FIG. 4 illustrates a portion of a data packet that includes a VTP pruning message generated by the control plane logic of a network device, according to one embodiment described herein. The VTP pruning message 400 may be embedded within a data structure (e.g., the payload of an Ethernet packet) or be transmitted as a standalone data frame. The VTP header 405 may include such information as the VTP version, the message type (e.g., summary advertisement, subset advertisement, advertisement request or VTP join message), management domain length, and management domain name. As shown here, the VTP message body 410 is a summary advertisement that indicates which VLANs the network device transmitting the message 400 wishes to subscribe to. Specifically, the VTP message 410 includes a message portion 415 that uses a bit-per-VLAN to identify which VLANs are part of the network device's subscription list (e.g., bit value of 1) and which are not (e.g., bit value of 0). Thus, a network device receiving VTP pruning message 400 updates its VLAN subscription for the receiving port to forward all flood traffic associated with VLAN 1 and 2 (whose corresponding bits are set to 1) but not flood traffic associated with VLAN 0 and 3 (whose corresponding bits are set to 0). As defined by VTP, this subscription is valid for 19 seconds or until a new VTP pruning message 400 is received at the port.

Returning to FIG. 3, the control plane logic 305 of network device 320 generates a VTP pruning message as shown in FIG. 4 which is received by network device 321 and processing by its own control plane logic. Network device 321 updates the port VLAN subscription 340 based on the bit-per-VLAN subscription data contained within the VTP pruning message. Thus, only the flood traffic corresponding to the VLANs identified in the VTP pruning message is forwarded from network device 321 to network device 320.

In one embodiment, the network device 320 is a single-supervisor device that does not provide redundant system for ensuring that at least a portion of the control plane remains available if the control plane logic is updated. For example, if the control plane logic 305 is being updated in an ISSU operation, a single supervisor device is unable to receive and process messages in the control plane which results in a control plane outage. Specifically, during an ISSU operation, the control plane outage is a planned software upgrade in contrast to an unplanned outage. During the upgrade, the network device 320 is unable to send the periodic VTP pruning messages required by the VTP pruning protocol to keep the VLAN subscription 340 stored in network device 321 current. For example, if the control plane logic 305 is unavailable for more than 19 seconds during an ISSU operation, then the VLAN subscription expires and the network device 321 stops forwarding flood traffic to the network device 320. However, the embodiments disclosed herein are not limited to only a single supervisor network device but may apply, for example, to network devices with multiple supervisor system that may experience control plane outages or network devices that are temporary unable to transmit control plane messages.

Figure 5:
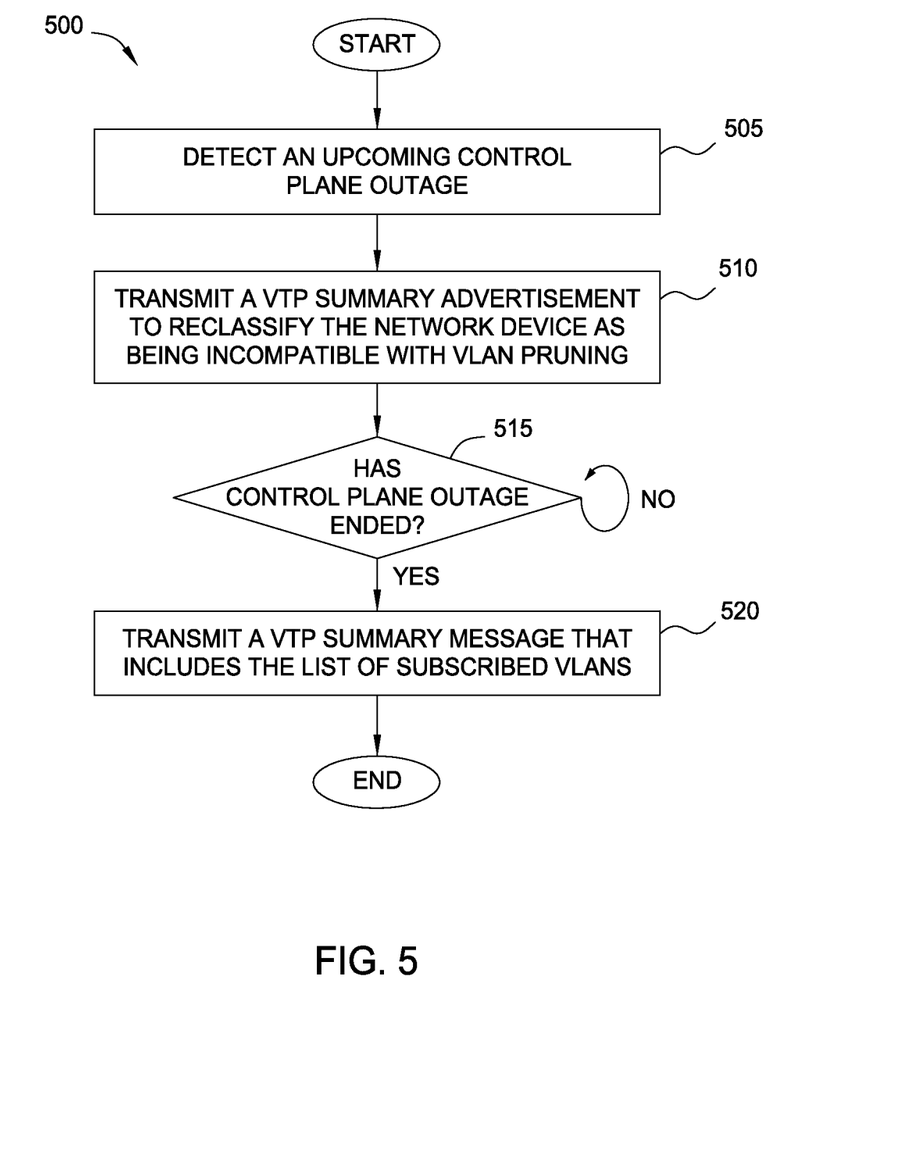
FIG. 5 illustrates a method for maintaining a VLAN subscription during a control plane outage, according to one embodiment described herein.

FIG. 5 illustrates a method for maintaining a VLAN subscription during a control plane outage, according to one embodiment described herein. The method 500 begins at block 505 when a network device detects an upcoming control plane outage. For example, a single supervisor network device may receive a control plane message that instructs the network device to begin an ISSU. This message may serve as an indicator to the network device that the control plane will soon be unavailable. Other indicators may include receiving data associated with ISSU or a prompt from a network administrator. Although ISSU is discussed as the cause of the control plane outage, this disclosure is not limited to such. More generally, any technique that causes a control plane outage yet permits the data plane to continue to function is within the scope of this disclosure.

At block 510, the network device may transmit a VTP message that reclassifies the network device as being incompatible with VLAN pruning. Because different network devices may not be compatible with the VLAN pruning techniques discussed above (e.g., network devices that support only earlier versions of the VTP protocol), VTP permits a network device incompatible with VLAN pruning to be treated differently in the network. When transmitting VTP messages to neighboring network devices, these devices indicate within the messages that they do not support VLAN pruning. In response, the neighboring network devices update their respective port VLAN subscriptions to forward all flood traffic for all VLANs to the network device. Here, even if the 19 second time limit expires, the neighboring network device maintains the VLAN subscription to continue to forward all flood traffic. In this manner, the network device incompatible with VLAN pruning continues to receive all the flood traffic for all VLANs without send periodic VTP pruning messages. If the network device does not need the flood traffic associated with a particular VLAN—i.e., the device is not connected to an end device of the VLAN—the flood traffic is ignored.

In method 500, a single supervisor network device about to experience a control plane outage may request that the network device be reclassified as incompatible with VLAN pruning. Specifically, the network device transmits a VTP summary advertisement to all neighboring network devices that indicates pruning is not supported. In response, the neighboring network devices stop using the timer to ensure that subscriptions are current and update the port VLAN subscription associated with the reclassified device to add all of the VLANs to the device's subscription. Thus, the control plane outage can last for any extended period of time yet the data plane will continue to receive and forward flood traffic without any service interruption to the end devices.

At block 515, the reclassified network device determines if the control plane outage is over and whether the control plane is once again available. In one embodiment, the control plane outage may end after the control plane logic has been upgraded—e.g., after ISSU has completed. At block 520, the network device may send another VTP summary advertisement that again reclassifies the network device. This second message indicates to the device's neighbors that the network device supports VLAN pruning. In this message (or in a subsequent VTP pruning message) the network device provides a bit-per VLAN subscription list that the neighboring devices use to update the corresponding port VLAN subscription. Once the VLAN subscription is updated, the neighboring devices resume forwarding the flood traffic only associated with VLANs to which the network device is subscribed. Moreover, the neighboring devices may resume using timers to ensure that the subscription list remains current and the network device may resume sending periodic VTP pruning messages to update its VLAN subscription.

VLAN Pruning Using MVRP

MVRP is a standard based protocol—IEEE 802.1ak—for automatic configuration of VLAN information on network devices. MVRP is an amendment to the IEEE 802.1Q standard and permits the network devices to register and deregister attribute values, such as VLAN identifiers and multicast group membership across a large LAN. Similar to VTP, MVRP establishes a VLAN registration service that permits network devices to register to receive flood traffic only from selected VLANs. MVRP provides a mechanism for dynamic maintenance of the contents of VLAN registration entries for each VLAN, and for propagating these entries to neighboring devices. VLAN registration established by MVRP allows the network devices to perform a similar process as VTP where a network device uses VLAN registration entries to inform neighboring devices which VLANs the device is interested in. In response, the neighboring devices forward only the flood traffic assigned to the VLANs of interest.

Referring to FIG. 3, in one embodiment, the network devices 320, 321 are configured to perform MVRP where network device 320 transmits one or more VLAN registration entries in a VLAN join message to network device 321. Network device 321 uses these entries to update the port VLAN subscription 340 which registers (or subscribes) the port 325 connected to network device 320 to the VLANs identified in the entries. In this manner, network device 321 identifies network device 320 as an active member of the identified VLANs, and thus, instructs the data plane logic 310 to forward any flood traffic assigned to those VLANs via the port 325 connected to network device 320.

Furthermore, MVRP defines a timer 335 (referred to as the LeaveAll Timer) which deregisters all the attributes periodically. Since one of these attributes may be the VLAN group membership, once the timer 335 expires, network device 321 changes the port VLAN subscription 340 to erase the VLAN subscription data associated with network device 320. Specifically, once the timer 335 expires, the network device 321 performs a re-registration process by transmitting a LeaveAll message which informs neighboring devices that the attributes are about to expire. If network device 320 does not respond to this message by re-registering before the timer expires, the VLAN subscription is pruned and network device 320 no longer receives flood traffic. If instead the control plane logic 305 of network device 320 responds to the message with a VLAN join message that re-registers the attributes before the timer expires, then traffic flow remains uninterrupted.

If timer 335 expires during a control plane outage, however, the network device 320 may be unable to respond to the re-registering advertisement sent by network device 321. The network device 321 interprets the non-response of network device 320 as the device 320 having no interest in subscribing to a VLAN and prunes the VLAN attributes associated with network device 320. In the case of ISSU, the control plane logic 305 may be unavailable for several minutes, but the LeaveAll timer is typically set around 10 seconds. If the timer 335 expires during this time frame, the control plane logic 305 is unable to transmit a VLAN join message in response to the advertisement transmitted by device 321 indicating that the timer 335 has expired.

Figure 6:
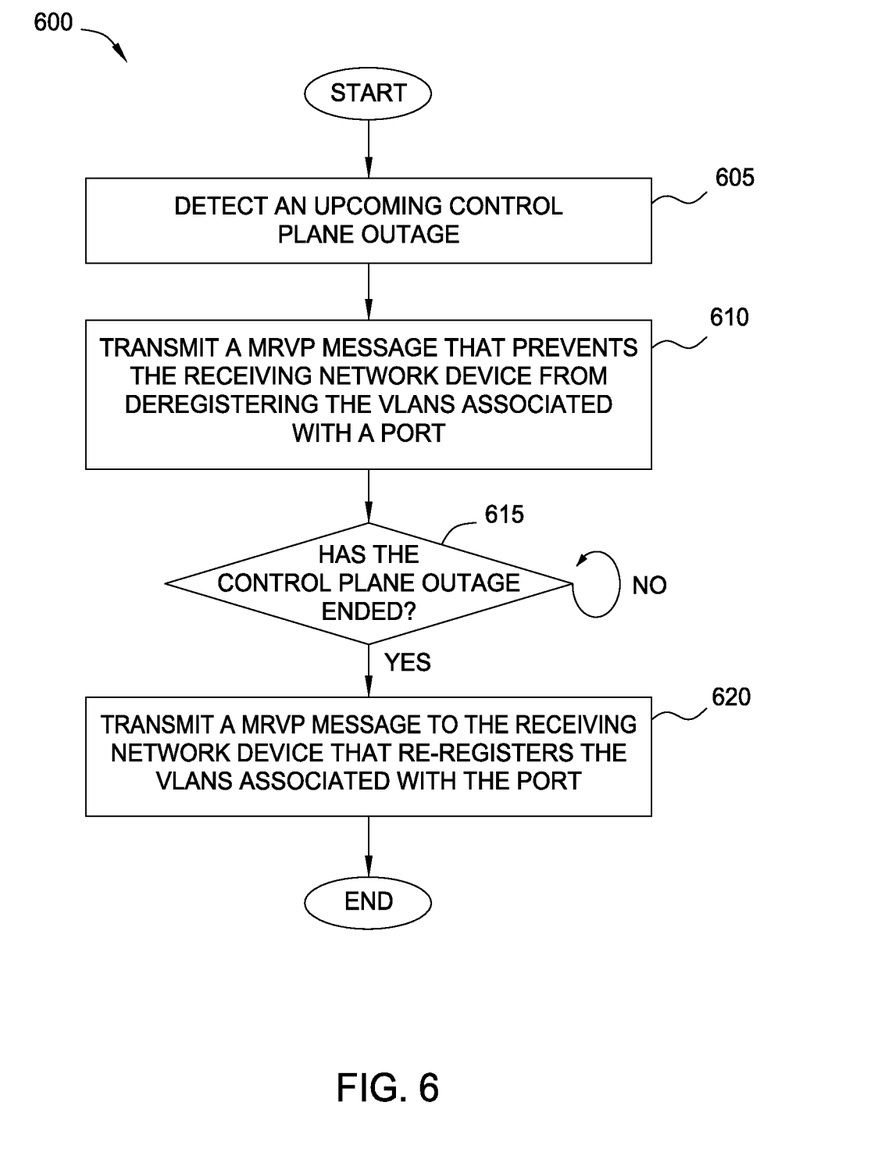
FIG. 6 illustrates a method for maintaining a VLAN subscription during a control plane outage, according to one embodiment described herein.

FIG. 6 illustrates a method for maintaining VLAN subscription during a control plane outage, according to one embodiment described herein. The method 600 begins at block 605 when a network device detects an upcoming control plane outage. For example, a single supervisor network device may receive a control plane message that instructs the network device to begin an ISSU. This message may serve as an indicator to the network device that the control plane will soon be unavailable. Other indicators may include receiving data associated with ISSU or a prompt from a network administrator. Although ISSU is discussed as the cause of the control plane outage, the disclosure is not limited to such. More generally, any technique that causes a control plane outage yet permits the data plane to continue to function is within the scope of this disclosure.

At block 610, the network device may transmit a MVRP message that prevents a neighboring network device from deregistering the VLANs associated with a particular port. In one embodiment, this MVRP message is different from any of the other message types defined in the IEEE 802.1ak protocol. Once received by the neighboring network device, the MVRP message may instruct the neighboring device to extend the LeaveAll timer to a value greater than the time needed for the control plane to become available. For example, ISSU may provide to the network device a maximum time needed to perform the upgrades. The network device then transmits this time via the MVRP message to all neighboring devices which would then update their respective LeaveAll timers to have a value greater than the maximum time needed to perform ISSU. In this manner, the neighboring devices would not begin the re-registration process until the control plane is once again available and able to respond to any received LeaveAll messages. In one embodiment, the network device may calculate an estimated time of the control plane outage based on historical data or use a predefined time that was stored in memory or provided by a network administrator. Advantageously, the neighboring device may maintain different LeaveAll timers for each port and the network devices connected to those ports. Thus, the neighboring device could extend the time of only the LeaveAll timer associated with the device undergoing the control plane outage and leave the other timers unchanged.

In one embodiment, the MVRP message may instruct the neighboring devices to change a state of the interface or port on which the message was received. This new state prevents the neighboring device from pruning the VLANs from the VLAN attributes until another MVRP message—e.g., a VLAN join message—is received or the communication link between the port and the network device fails. Thus, even if the timer expires and triggers the re-registration process, the neighboring device does not prune the current VLAN subscription. Accordingly, the flood traffic remains uninterrupted even during a control plane outage.

In a particular embodiment, the new state may subscribe the network device to all of the possible VLANs rather than maintaining the current VLAN attributes. For example, if while the control plane is being upgraded, an end device connected to the network device joins a new VLAN that was not part of the current VLAN subscription, the end device must wait until the control plane of the network device becomes available and updates the VLAN subscription before receiving the flood traffic associated with the new VLAN. However, if the state causes the neighboring device to update the VLAN subscription such that all flood traffic is forwarded to the network device experiencing the control plane outage, then any connected end device can begin to receive flood traffic for any VLAN without requiring the control plane to change the VLAN subscription.

At block 615, the network device determines if the control plane outage is over and whether the control plane is once again available. In one embodiment, the control plane outage may end after the control plane logic has been upgraded—e.g., after an ISSU has completed. At block 620, the network device may send another MVRP message that updates the VLAN attributes maintained by the neighboring devices. In one embodiment, if the first MVRP message sent in block 610 added time to the LeaveAll timer, the second MVRP message may be sent in response to the LeaveAll timer expiring. That is, even after the control plane is available, the network device may wait until receiving a LeaveAll timer expiration message before sending the second MVRP message to re-register the attributes. Alternatively, the network device may send the MVRP message once the control plane becomes available.

If the first MVRP message changed the state of a port or interface of a neighboring device, the second MVRP message may instruct the neighboring network device to return the normal state—i.e., a state where the attributes expire according to the LeaveAll timer. The second MVRP message may also re-register the attributes to subscribe the network device to one or more VLANs; however, this could be done by transmitting subsequent messages. In one embodiment, the network device may wait to transmit the second MVRP message until the VLAN subscription changes. That is, the network device may permit the port on the neighboring device to remain in the new state until the network device needs to changes its VLAN attributes. If, however, the new state instructs the neighboring devices to forward all flood traffic associated with all the VLANs to the network device, the device may send the second MVRP message once to the control plane becomes available to subscribe the network device to only a portion of the VLANs, thereby limiting the amount of unnecessary flood traffic transmitted to the device.

An Example Communication System

Figure 7:
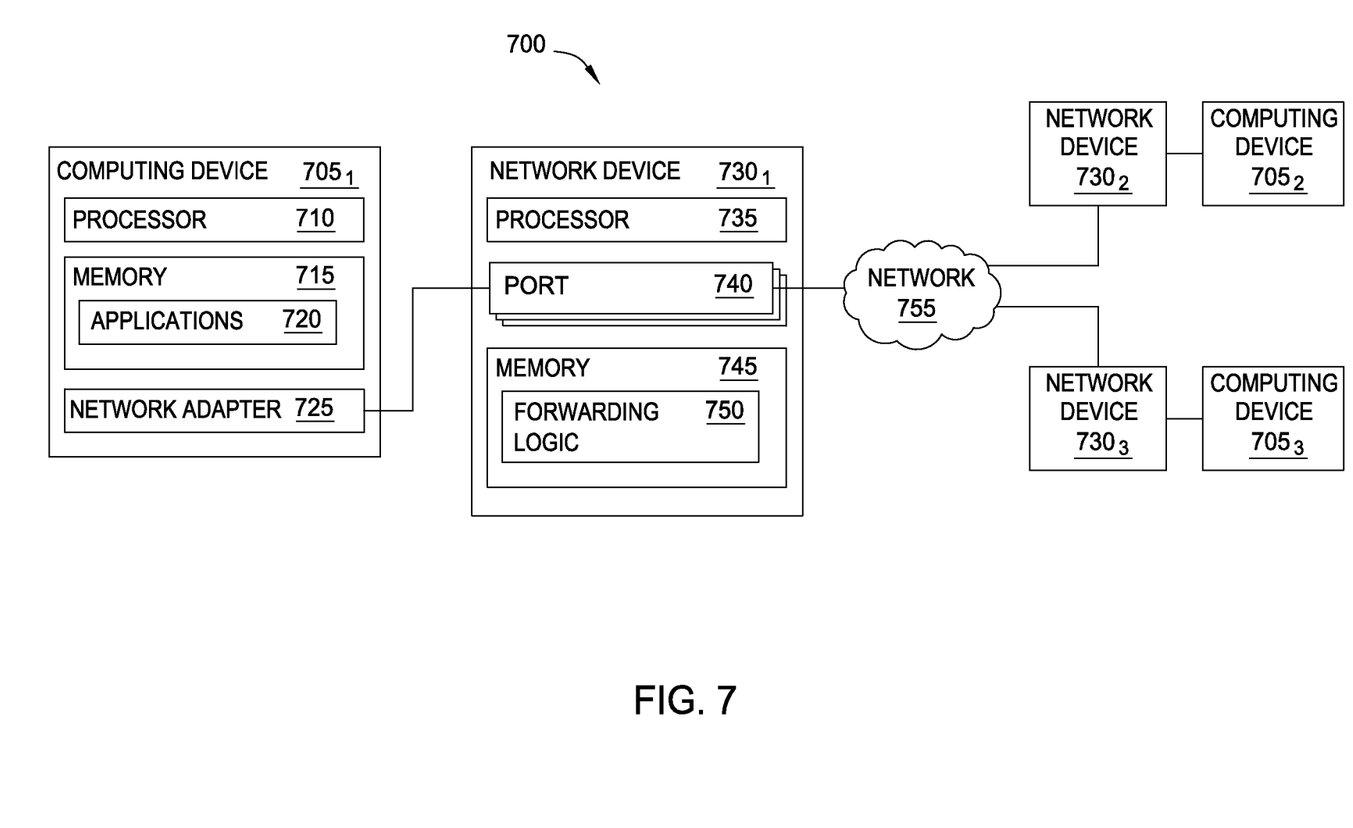
FIG. 7 illustrates a communication network, according to one embodiment described herein.

FIG. 7 illustrates a communication network, according to one embodiment described herein. Communication network 700 includes a plurality of computing device 705 and network devices 730. Each computing device (or end device) $705_{1-3}$ includes a processor 710, memory 715, and network adapter 725. The processor 710 may be any processing element capable of performing the functions described herein. The processor 710 represents single processor, multiple processors, a processor with multiple cores, and combinations thereof. The memory 715 may be either volatile or non-volatile memory and include, RAM, flash, cache, disk drives and the like. Although shown as a single entity, the memory 715 may be divided into different memory storage element such as RAM and one or more hard disk drives.

The network adapter 725 facilitates communication between the computing devices 705 and the network devices 730. The network adapter may use either wired or wireless communication techniques to transmit data to, and receive data from, the network devices 730. For example, the applications 720 may use the network adapter to enable communication to other computer devices $705_{2,3}$.

The network devices 730 include a processor 735, communication ports 740, and memory 745. The processor 735 may be any processing element capable of performing the functions described herein. The processor 735 represents a single processor, multiple processors, a processor with multiple cores, and combinations thereof. The memory 745 may be either volatile or non-volatile memory and include, RAM, flash, cache, disk drives and the like. Moreover, the memory 745 contains network logic 750—e.g., a content addressable memory—for forwarding data in the communication network 700. As discussed previously, the network devices 730 may include a control plane for configuring and managing the forwarding logic 750.

A network device 730 may be coupled to one or more computing devices 705, network devices 730, or a combination of both using the ports 740. For example, the network 755 represents one or more network devices that forward data plane traffic from one end device to another. The network may be a WAN (e.g., the Internet) or a LAN. In addition to forwarding data plane traffic, the network 755 may forward management plane or control plane traffic between the network devices 730 or between the network devices 730 and the computing devices 705.

CONCLUSION

In Service Software Upgrade (ISSU) permits administrators to upgrade the control plane software or firmware of a network device without any disruption to the traffic passing through the data plane of the network device. However, because the control plane is unavailable, the network device is unable to transmit periodic control plane messages to re-subscribe to identified VLANs. This problem is especially relevant in single supervisor network devices—i.e., network devices without redundant supervisors that allow at least some portion of the control plane to function during ISSU. Accordingly, before ISSU is finished and the control plane comes back online, a single supervisor network device may have been unsubscribed from VLANs, and thus, not received flood traffic associated with those VLANs. This may result in the end devices not receiving flood traffic intended for them.

To prevent a single supervisor network device from being unsubscribed from the VLANs while the control plane is unavailable, the network device may transmit a control plane message before starting ISSU. That is, once the network device receives an instruction to perform a software upgrade that renders the control plane unavailable, before performing the upgrade, the network device transmits a first control plane message to each of the neighboring network devices that prevents these devices from unsubscribing the network device before the device can send a second control plane message after the control plane becomes available. For example, the first message may increase the value of a timer that governs when the connected network device un-subscribes the network device from the VLANs. Alternatively, the first message may instruct the neighboring network device to change its state such that the connected network device will not prune the identified VLANs until the second message is received. In this manner, the single supervisor network device may perform ISSU without the potential of flood traffic not reaching any end devices coupled directly or indirectly to the network device.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i)

non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of managing a control plane outage in a first network device coupled to a second network device, comprising:
    in response to detecting an upcoming control plane outage at the first network device, transmitting a first message to the second network device indicating that the first network device is incompatible with one or more VLAN pruning techniques, wherein, upon receiving the first message, the second network device is configured in a manner to prevent the second network device from unsubscribing the first network device from one or more VLANs until a timer on the second network device expires and is further configured to unsubscribe the first network device from the one or more VLANs upon expiration of the timer, and wherein the first message prevents the timer from expiring while the control plane of the first network device is unavailable as a result of the control plane outage;
    while the control plane of the first network device is unavailable, receiving data assigned to the one or more VLANs from the second network device; and
    after determining that the control plane is available, periodically transmitting update messages to the second network device identifying one or more VLANs to which the first network device wants to subscribe.

2. The method of claim 1, wherein the second network device, upon determining to unsubscribe the first network device from the one or more VLANs, is configured to not forward data associated with the one or more VLANs to the first network device.

3. The method of claim 1, wherein the first network device is a single supervisor network device such that the first network device is unable to process control plane traffic while the control plane is unavailable.

4. The method of claim 3, wherein the control plane outage is caused by an In Service Software Upgrade permitting the control plane to be upgraded without disrupting data plane traffic passing through the first network device.

5. The method of claim 1, wherein the first message prevents the second network device from unsubscribing the first network device from the one or more VLANs until the update messages are transmitted.

6. The method of claim 1, wherein the first network device is configured to perform at least one of: VLAN Trunking Protocol and Multiple VLAN Registration Protocol.

7. A network device, comprising:
    logic configured to detect an upcoming control plane outage in the network device and, in response to detecting the upcoming control plane outage at the network device, transmit a first message to a neighboring network device indicating that the first network device is incompatible with one or more VLAN pruning techniques, wherein, upon receiving the first message, the neighboring network device is configured in a manner to prevent the neighboring network device from unsubscribing the network device from one or more VLANs until a timer on the second network device expires and is further configured to unsubscribe the first network device from the one or more VLANs upon expiration of the timer, and wherein the first message prevents the timer from expiring while the control plane of the first network device is unavailable as a result of the control plane outage; and
    a data port configured to, while the control plane of the network device is unavailable, receive data assigned to the one or more VLANs from the neighboring network device,
    wherein, after determining that the control plane is available, the logic is configured to transmit periodic update messages to the neighboring network device identifying one or more VLANs to which the network device wants to subscribe.

8. The network device of claim 7, wherein the network device is a single supervisor network device such that the network device is unable to process control plane traffic while the control plane is unavailable.

9. The network device of claim 8, wherein the control plane outage is caused by an In Service Software Upgrade permitting the control plane to be upgraded without disrupting data plane traffic passing through the network device.

10. The network device of claim 7, wherein the first message prevents the neighboring network device from unsubscribing the network device from the one or more VLANs until the update messages are transmitted.

11. The network device of claim 7, wherein the network device is configured to perform at least one of: VLAN Trunking Protocol and Multiple VLAN Registration Protocol.

12. A computer program product, comprising:
    computer code that detects an upcoming control plane outage in a first network device coupled to a second network device;
    computer code that, in response to detecting the upcoming control plane outage at the first network device, transmits a first message to the second network device indicating that the first network device is incompatible with one or more VLAN pruning techniques, wherein, upon receiving the first message preventing, the second network device is configured in a manner to prevent the second network device from unsubscribing the first network device from one or more VLANs until a timer on the second network device expires and is further configured to unsubscribe the first network device from the one or more VLANs upon expiration of the timer, and wherein the first message prevents the timer from expiring while the control plane of the first network device is unavailable as a result of the control plane outage;

computer code that, while the control plane of the first network device is unavailable, receives data assigned to the one or more VLANs from the second network device;

computer code that, upon the determining that the control plane is available, transmits periodic update messages to the second network device identifying one or more VLANs to which the first network device wants to subscribe; and a computer readable storage medium that stores the computer codes.

13. The computer program product of claim 12, wherein the first network device is a single supervisor network device such that the first network device is unable to process control plane traffic while the control plane is unavailable.

14. The computer program product of claim 13, wherein the control plane outage is caused by an In Service Software Upgrade permitting the control plane to be upgraded without disrupting data plane traffic passing through the first network device.

15. The computer program product of claim 12, wherein the first message prevents the second network device from unsubscribing the first network device from the one or more VLANs until the update messages are transmitted.

16. The computer program product of claim 12, wherein the first network device is configured to perform at least one of: VLAN Trunking Protocol and Multiple VLAN Registration Protocol.

* * * * *